United States Patent
Duret et al.

(10) Patent No.: US 6,871,554 B2
(45) Date of Patent: Mar. 29, 2005

(54) ABSOLUTE ANGLE SENSOR WITH A MAGNETIC ENCODER HAVING NON-EVEN SPACED REFERENCE PULSES

(75) Inventors: M. Christophe Duret, Quintal (FR); Pascal Desbiolles, Thorens Glieres (FR)

(73) Assignee: Timken US Corporation, Torrington, CT (US)

( * ) Notice: Subject to any disclaimer, the term of this patent is extended or adjusted under 35 U.S.C. 154(b) by 0 days.

(21) Appl. No.: 10/674,628

(22) Filed: Sep. 29, 2003

(65) Prior Publication Data

US 2004/0129091 A1 Jul. 8, 2004

(30) Foreign Application Priority Data

Sep. 27, 2002 (FR) .............................. 02 12013

(51) Int. Cl.[7] .................................................. G01L 3/02
(52) U.S. Cl. ................................................ 73/862.332
(58) Field of Search ..................... 73/862.331, 862.332, 73/862.333

(56) References Cited

U.S. PATENT DOCUMENTS

| | | | |
|---|---|---|---|
| 3,717,869 A | * | 2/1973 | Batz ............................ 341/11 |
| 5,617,320 A | * | 4/1997 | Petersen et al. ............. 701/220 |
| 6,552,534 B2 | * | 4/2003 | Desbiolles et al. ..... 324/207.25 |
| 2002/0024336 A1 | | 2/2002 | Desbiolles et al. |

FOREIGN PATENT DOCUMENTS

| | | |
|---|---|---|
| DE | 3928027 | 3/1990 |
| EP | 0321439 | 6/1989 |
| EP | 1167927 | 1/2002 |

* cited by examiner

*Primary Examiner*—Max Noori
(74) *Attorney, Agent, or Firm*—Michael Best & Friedrich LLP

(57) ABSTRACT

A device for determining the absolute angular position of a turning device with respect to a fixed structure, including an encoder provided with a main multipolar track and a multipolar track called "top turn", said top turn track includes M singularities which are distributed angularly so that the top turn signal (C) is arranged so as to define, in conjunction with the signals A and B, the binary sequences which are each representative of an absolute angular position of the encoder. The invention also concerns a steering system for automobiles as well as a bearing including such a device.

11 Claims, 2 Drawing Sheets

ABSOLUTE ANGLE SENSOR WITH A MAGNETIC ENCODER HAVING NON-EVEN SPACED REFERENCE PULSES

BACKGROUND

The invention involves a device for determining the absolute angular position of a device turning with respect to a fixed structure, a steering system for an automotive vehicle as well as a bearing including such a device.

In numerous applications, especially automobiles such as trajectory control systems or electric power-assisted steering systems, we need to know the absolute angular position of a device turning with respect to a fixed structure.

By absolute angular position is understood the angle separating the position of the turning device at a given instant, from a reference position of a turning device, this reference position is given and fixed with respect to the fixed structure.

By contrast, the relative angular position is the angle separating the device's position from an arbitrary and variable initial position with respect to the fixed structure.

Such a device is known from document EP-1 167 927 which specifically uses an encoder intended to be set in rotation together with the turning device, said encoder includes a main multipolar track and a multipolar track called "top turn" which are concentric, this top turn track includes a singularity so that the associated sensor delivers one pulse per revolution of the encoder. After being placed in service, such a device determines the absolute angular position after the detection of the first top turn pulse.

One limitation of this device is the pulse detection only occurs once per revolution of the encoder. In some cases, it turns out that a significant angular displacement of the turning device should be performed before learning the absolute angular position. And with the known device, it is not possible to increase the number of singularities per revolution of the encoder from the inability to discriminate between them.

SUMMARY

The invention specifically proposes a perfected device which, after placing it in service, allows the determination of the absolute angular position of the encoder after an angular displacement which is reduced and adjustable as a function of the application envisaged.

For this purpose, and according to a first feature, the invention proposes a device for determining the absolute angular position of a turning device with respect to a fixed structure, said device includes:

An encoder intended to be placed in rotation together with the turning device, said encoder includes a main multipolar track and a multipolar track called "top turn" which are concentric, this top turn track includes M angular-distributed singularities;

A fixed sensor arranged with respect to and at a gap distance from the encoder, including at least three sensitive elements where at least two are positioned with respect to the main track so as to deliver two periodic electrical signals S1, S2, in quadrature, where at least one is positioned with respect to the top turn track so as to deliver an electrical signal S3, the sensor includes a suitable electronic circuit, so that from signals S1, S2 and S3, it delivers two squared digital position signals A, B in quadrature which represent the angular position of the turning device and a top turn signal C in the form of M pulses per turn of the encoder;

A processing device for signals A, B, C which includes a means for counting suited to determine, starting from the initial positions, the variations of the angular position encoder;

in which the M singularities are angular-distributed so that the signal C is arranged where in combinations with the A and B signals, to define the binary sequences which are each representative of angular positions of the encoder, the processing devices includes means for updating the initial position which, upon detecting a binary sequence, is capable of determining, with respect to the initial position, the absolute angular position value associated with said binary sequence.

According to a second feature, the invention proposes a bearing equipped with such a determination devices, of a type including a fixed bearing race intended to be associated with a fixed device, a turning bearing race intended to be set in rotation by the turning device and the bearings arranged between said ring, in which the encoder is associated with the turning bearing race.

According to a third feature, the invention proposes a steering system for an automobile, including such a determination device, the encoder is solidly in rotation with the vehicle steering wheel and the sensor is solidly attached to the vehicle chassis, so as to measure the absolute angular position of the steering wheel with respect to the chassis.

BRIEF DESCRIPTION OF THE DRAWINGS

Other purposes and advantages of the invention appear during the description which follows, made in reference to the attached drawing, in which.

DETAILED DESCRIPTION OF THE PREFERRED EMBODIMENTS

Figure 1:
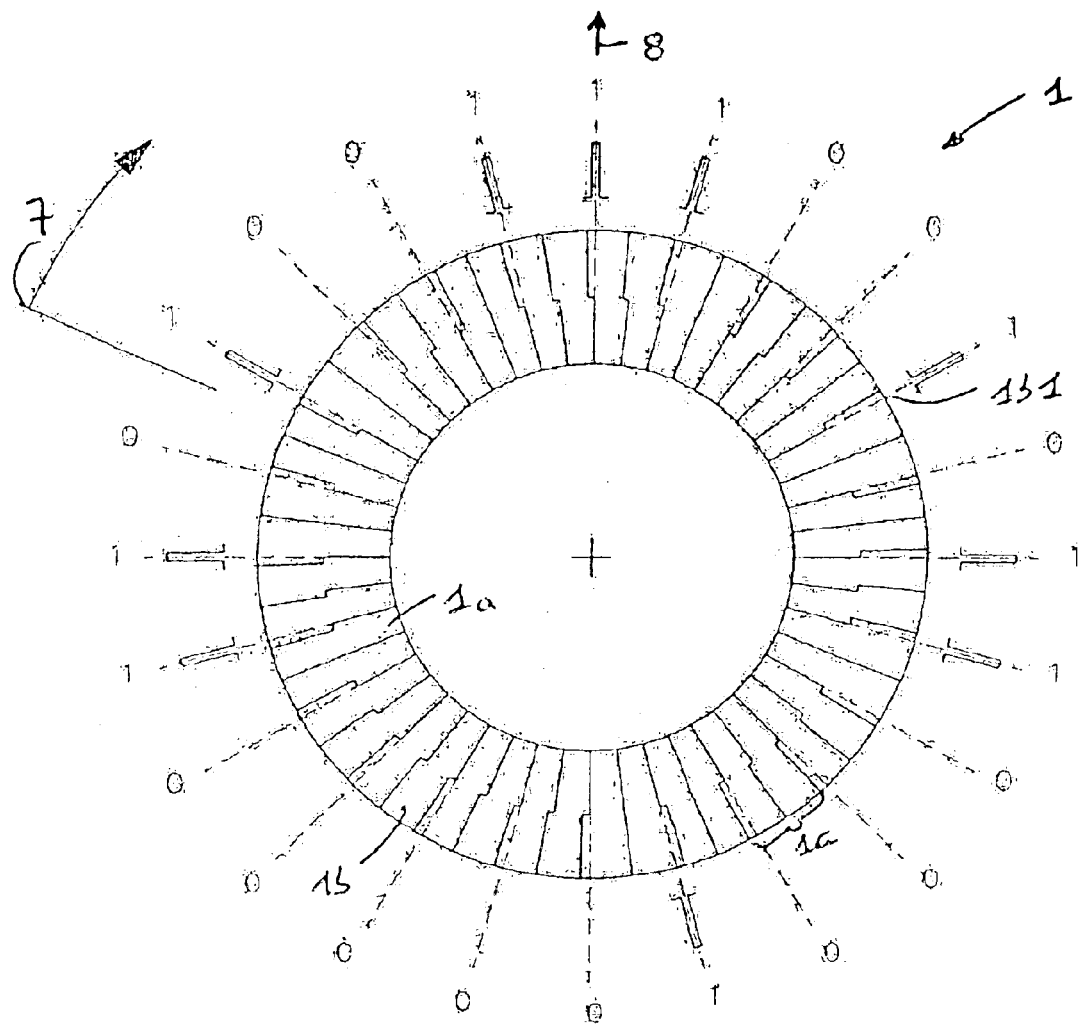
FIG. 1 is a frontal view of an encoder usable in a determination device according to the invention, said encoder includes a main multipolar track and top turn multipolar track.

The invention involves a device for determining the absolute angular position of a turning device with respect to the fixed structure, which includes an encoder 1 as represented in FIG. 1.

In a particular application envisaged, the device is incorporated into a steering system so as to measure the absolute angular position of the steering wheel 2 with respect to the chassis, this measurement may be used in the trajectory control systems of vehicles or power steering systems.

Figure 2:
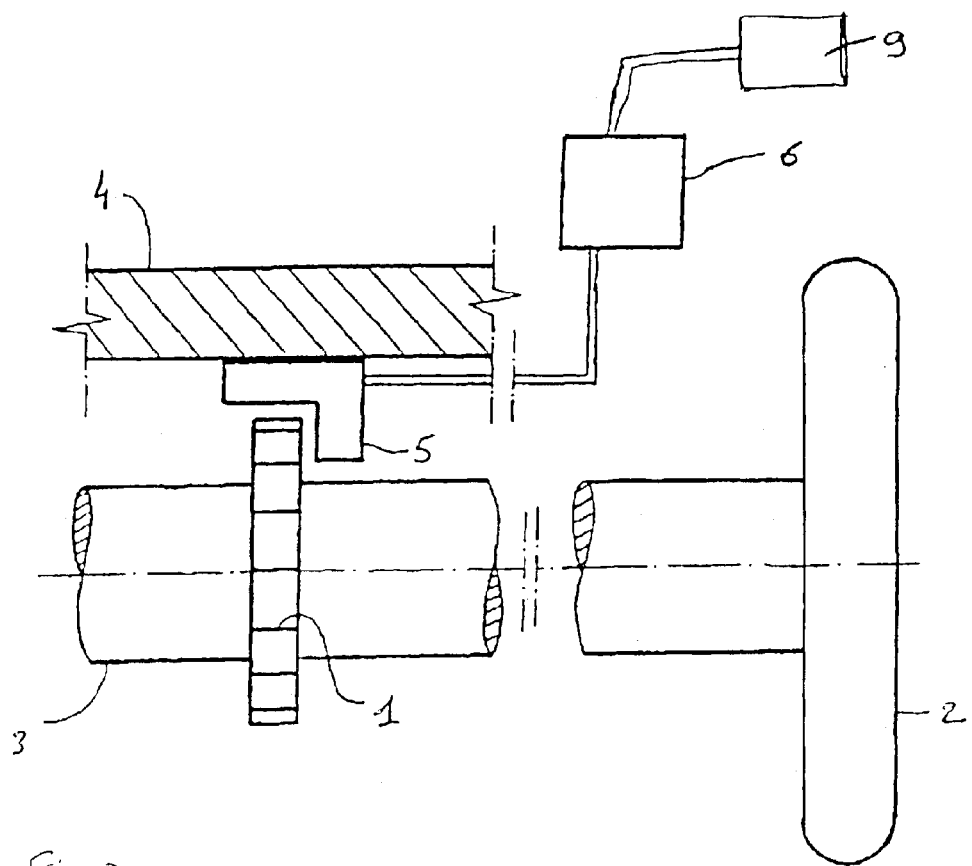
FIG. 2 is a diagrammatic and partial view of a steering system for an automobile, which is equipped with a device for determining the absolute angular position of the steering wheel.

With regard to FIG. 2, a steering system is described including a steering column 3 on which an encoder 1 is mounted as represented on FIG. 1, so as to assure the solidity in rotation of the column 3 and the encoder 1. In a known fashion, the column 3 is associated with the steering wheel 2 by means of which the driver applies a steering couple. Furthermore the column 3 is arranged so as to transmit the steering couple to the vehicle's turning wheels. For this purpose, the wheels may be mechanically linked to the steering column 3 by means of a rack and pinion so as to transform the rotation movement of the steering column 3 into angular displacement of the wheels, or is decoupled from the column 3. In this latter case, the encoder can be directly associated with a part of the steering wheel.

The steering wheel 2 is arranged so as to be able to make several turns, typically two, around the position in which the turning wheels are straight.

The steering system includes in addition a fixed element 4 solidly attached to the vehicle automobile chassis, a sensor 5 is associated with said element so that the sensitive elements of the sensor are arranged with respect to and at a gap distance from the encoder 1.

In order to determine the absolute angular position of the encoder 1, and thus of the steering wheel 2, with respect to the fixed element 4, and therefore with respect to the chassis, the encoder 1 includes a main multipolar track 1a and a multipolar track called "top turn" 1b which are concentric. The top turn track 1b includes M (with M>1) angular-distributed singularities 1b1.

In a particular example, the encoder 1 is formed by a magnetic multipolar ring on which multiple pairs 1c of North—South poles are magnetized equally distributed with a constant angle width so as to form the main track 1a and top turn track 1b, a magnetic singularity 1b1 of the top turn 1b which is formed by two adjacent poles, where the magnetic transition is different from the others.

According to the representation in FIG. 1, the main tracks 1a, arranged inside the ring, and top turn 1b, arranged toward the outside of the ring, including 24 pairs of poles 1c, the pole pairs 1c from the top turn track 1b have a phase lag I with respect to those of the main track 1a.

Each singularity 1b1 is formed by a pair of poles 1c, the width of the poles is arranged so that a pole is out-of-phase by −I with respect to the corresponding pole of the main track 1a. Thus, each signal pulse C corresponds to detection of the phase lag reversal between the main track 1a and the top turn track 1b.

Moreover, the sensor 5 includes at least three sensitive elements where at least two are positioned with respect to the main track 1a and at least one is positioned with respect to the top turn track 1b.

In a particular example, the sensitive elements are chosen from the group including the Hall effect probes, magnetoresistances, giant magnetoresistances.

The sensor 5 used is capable of delivering two periodic electrical signals S1, S2, in quadrature by means of the sensitive elements arranged with regard to the main track 1a and an electrical signal S3 by means of the sensitive elements arranged with regard to the top turn track 1b.

The principle for obtaining signals S1 and S2 from a multitude of aligned sensitive elements is described for example in the document FR-2 792 403 issued by the petitioner. But the sensors 5 include two sensitive elements which are capable of delivering the signals S1 and S2 are also known.

The sensor 5 includes in addition an electronic circuit which from the signals S1, S2 and S3, delivers the squared digital position signals A, B in quadrature and a top turn signal C in the form of M electrical pulses per revolution of the encoder 1.

A principle for obtaining the digital signals A, B and C, as well as the different implementation modes of the magnetic singularities 1b1, are described in the documents FR-2 769 088 and EP-0 871 014.

According to the implementation, sensor 5 includes in addition an interpolator of a type for example described in document FR-2 754 063 by the petitioner, allowing the output signal resolution to be increased.

Sensor 5 may be incorporated on a silicon or similar substrate for example AsGa, so as to form an integrated circuit and customized for a specific application, a circuit sometimes denoted under the term ASIC (Application Specific Integrated Circuit) to refer to an integrated circuit designed entirely or partially as a function of its specific purpose.

Although the description is made in relation to a magnetic encoder/sensor assembly, it is also possible to implement the invention in an analogous fashion using an optical sensor. For example, the encoder 1 can be formed by a metal or glass tracking pattern on which the main tracks 1a and the top turn track 1b are engraved so as to form an optical pattern analogous to the multipolar magnetic pattern stated above, the sensitive elements are then formed by optical detectors.

The determination devices includes besides a processing device 6 for the signals A, B, C which includes a means for counting capable of determining, from the initial position, the variations of the angular position of encoder 1. In the implementation example, the means of counting includes a register in which the angular position value is increased or decreased corresponding to the number of wavefronts of the A and B signals detected, where the initial values is for example fixed at zero on commissioning the device. Thus the decoder allows determining the relative position of the encoder 1 with respect to the initial position.

In order to obtain the absolute angular position of the turning device, the use of the encoder 1 is foreseen where the distribution of the singularities 1b1 from the top turn track of 1b is specific.

In the implementation mode represented in FIG. 1, the angular distribution of the ten singularities 1b1 from the top turn track 1b may be represented by the binary pattern 0000010001101001110010111 obtained by using the signal C and the signals A and B upon the rotation of one revolution, where the number 1 corresponds to the detection of a singularity 1b1 on the signal C and the number 0 to the absence of detection of any such singularity, the numbers 0 and 1 are thus allocated respectively to the pairs of poles which are differentiated by means of the signals A, B.

With this binary pattern, it is possible to establish the number of 0 or 1 states to be read, as a function of the initial position of the encoder 1 and the rotation direction, so as to determine the position of the encoder in an unequivocal fashion on one revolution. In the following description, this succession of 1's or 0's which permits determining an absolute position of the encoder 1 on one revolution, is called a binary sequence.

According to the invention, the M singularities 1b1 are angularly distributed over the encoder where the signal C is arranged so to define, in combination with the signals A and B, the binary sequences which are each representative of an angular position of the encoder. For this purpose, prior to the use of the determination device, the absolute angular position of one or several singularities can be indexed with respect to a reference position. Specifically in a steering system type of application, the reference position can be the in-line position of the wheels. This indexing can be realized in an output string, and on a dedicated instrument bench, the absolute position values can be stored in an EEPROM or flash type memory of the processing device. This indexing may also be implemented in a mechanical fashion.

Thus the processing of the A, B and C signals allows a string of 1's and 0's to be constructed from which we seek to locate in the binary pattern when this string is sufficiently long to be unique and form a binary sequence, the absolute angle associated with this last detected state is known.

And at the detection time of a binary sequence, the absolute angular position of the encoder 1 is assigned, with respect to the initial value, in the processing device 6 via a means of updating so as to learn, in a continuous fashion, the absolute angular position through a means of counting.

According to one implementation mode, the processing device 6 is a microprocessor arranged so as to receive the signals A, B, C, coming from the sensor 5, in which the binary sequences and the associated absolute angular positions are stored.

For example, starting from the position indicated by arrow 7 in FIG. 1, after the string 10011 is detected, it is identified as a unique binary sequence in the binary pattern, and the angular position represented by the arrow 8 on FIG. 1 is the absolute angular position associated with this binary sequence.

In the implementation mode of encoder 1 from FIG. 1, we can show that whatever the starting angle for commissioning the detection device, the absolute angle is known, in the worst case scenario, after a rotation of 75θ in one direction or the other.

In addition, with the encoder 1 from FIG. 1, the absolute angular position is determined if we perform:
- a rotation to the left of more than 15θ followed by a rotation to the right of more than 15θ, in the case where the initial position is close to the "in-line" position (arrow 8); or
- a rotation to the left of more than 30θ followed by a rotation to the right of more than 30θ, in the case where the initial position is within the angular sector [−90θ, 90θ] around the "in-line" position According to the invention, it is therefore possible after commissioning the device, to learn the absolute position of the encoder 1, and thus of the associated turning device, as long as it has turned an angle less than one revolution, and this is from specifically the presence or absence of M singularities 1b1 which are not equally distributed in an specific fashion on the top turn track 1b.

As a function of the specific requirements of each application, it is possible to distribute the singularities 1b1 differently over the top turn track 1b so as to either increase or decrease the maximum length of the binary sequence in the binary pattern, that is to say, the maximum rotation angle which permits the determination in all cases of the absolute angle. In addition, it is also possible to cause the number of pole pairs 1c to vary and thus to obtain a more or less extensive binary pattern, and/or to vary the dimensions of the encoder 1.

Furthermore specifically in the application of steering type systems, the distribution of singularities 1b1 may be arranged so as to optimize the rotation angle values which are required in one direction and the other so as to determine the absolute angle, this alternate rotation can be performed around the "in-line" position or around any initial position whatsoever.

In addition specifically in the application in point where the turning device is intended to perform multiple revolutions, the determination device includes a means for differentiation 9 of the revolution in whatever angular position is determined, so as to determine the absolute angular position over the number of revolutions.

According to another implementation mode, the top turn track 1b includes N sectors, each provide with M/N angular distributed singularities 1b1. The device may then include the discrimination means 9 for the sector in which the angular position is determined. In one implementation example, the angular distribution of the M/N singularities 1b1 is identical for each sector.

Thus, when the angular position is determined for the detection of a binary sequence, said position is known to the nearest revolution or sector, and the means for discrimination 9 allows taking this uncertainty into consideration and therefore to learn the absolute angular position to use with respect to the initial value.

In the example considered above, the binary sequence 10011 allows determining the "in-line" position with respect to the absolute position, and the signals coming from the means of discrimination 9 allow determining whether the absolute angle is −720θ, −360θ, 0θ, 360θ or 720θ (in the case where the steering wheel is set up so as to turn ±2 full revolutions).

The means of discrimination 9 may include electromechanical devices associated with the turning device, such as a potentiometer. In the steering application, the means of discrimination 9 may include a resource for analyzing the differential speed of the vehicles wheels. Effectively, the differential speed of the wheels varies as a function of the turning angle which, as a function of the sign and the modulus of said speed, permits the discrimination of the revolution or even the sector in which the absolute angular position is determined.

In one variation, the discrimination means 9 may include an accelerometer or a gyroscope.

In another, the reading of a non-unique binary string in the binary pattern may be sufficient to determine the absolute angular position on the condition that the other occurrence or occurrences of the string in the pattern are positioned at angular positions more than twice removed from the angular uncertainty of the means of discrimination 9.

Figure 3:
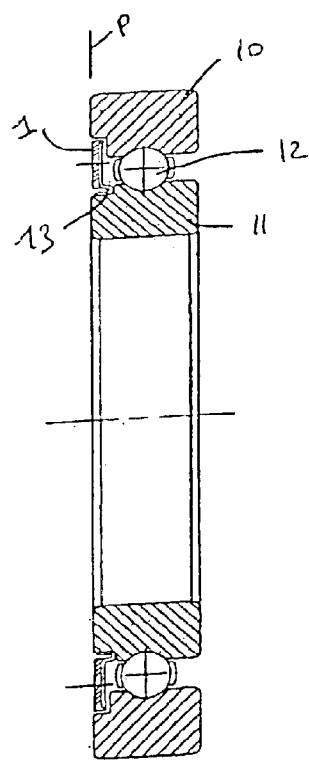
FIG. 3 is a view in longitudinal cross-section of a bearing equipped with a device for determining the absolute angular position of the turning bearing race with respect to the fixed bearing race, the sensor and the signal processing device are not represented.

With regard to FIG. 3, a bearing is described including an external fixed bearing race 10 intended to be associated with a fixed device, an internal rotation race 11, intended to be set in rotation by the turning device and the bearings 12 arranged between these two races.

In the represented implemented mode, the encoder 1 is duplicate molded on a annular cylindrical roll neck of an armature 13, which is associated for example by the fit, on the face of the internal bearing race 11.

The encoder 1 is associated with the turning bearing race 11 so that the external face of said encoder is essentially contained in the plane P of a lateral face of the fixed bearing race 10. This feature which is specifically disclosed in the document EP-0 607 719 from the petitioner, allows protecting the encoder 1 within the bearing on the one hand and on the other hand to be able to separate the sensor 5 from the bearing with regard to controlling the gap distance.

In one implementation mode, the steering wheel is guided in rotation by such a bearing so as to determine the absolute angular position of the steering wheel 2 with respect to the chassis, as well as the steering functions and angle measurements are determined by means of a similar mechanical device.

What is claimed is:
1. Device for determining the absolute angular position of a turning device with respect to a fixed structure, where said device includes:

an encoder adapted for rotation together with the turning device, said encoder includes a main multipolar track and a top turn track which are concentric, said top turn track includes M angular distributed singularities;

a fixed sensor arranged with regard to a gap distance of the encoder including at least three sensing elements where at least two are positioned with regard to the main multipolar track so as to deliver two periodic signals S1, S2 in quadrature and at least one is positioned with respect to the top turn track so as to deliver an electrical signal S3, the sensor includes an electronic circuit capable of delivering, starting from the signals S1, S2 and S3, two squared digital position signals (A, B) in quadrature which are representative of the angular position of the turning device and one top turn signal (C) in the form of M pulses per revolution of the encoder;

one processing device of the signals (A, B, C) which includes an appropriate means of counting, to determine, starting from an initial position, variations of the angular positions of the encoder;

in which the M singularities are angularly distributed so that the top turn signal (C) is arranged so as to define, together with the signals (A, B), the binary sequences which are each representative of an absolute angular position of the encoder, the processing device includes means for updating the initial position which, at the time of detecting a binary sequence, are suitable to assign, with regard to the initial position, the absolute angular position value associated with each binary sequence.

2. Device according to claim 1, further comprising revolution discrimination means in which the absolute angular position is determined.

3. Device according to claim 1, characterized in that the top turn track includes N sectors each provided with M/N angular distributed singularities.

4. Device according to claim 3, further comprising a means of sector discrimination via which the angular position is determined.

5. Device according to claim 3, characterized in that the angular distribution of the M/N singularities is identical for each sector.

6. Device according to claim 1, characterized in that each multipolar track is formed by a magnetic ring on which equidistributed North and South poles are magnetized with a constant angle width, a magnetic singularity from the top turn track is formed by two adjacent poles where the magnetic transition is different from others.

7. Bearing equipped with a determination device according to claim 1, of a type including a fixed bearing race intended to be associated with a fixed device, a turning bearing race intended to be set in rotation by the turning device and bearings arranged between these races, said bearing is characterized in that the encoder is associated with the turning bearing race.

8. Bearing according to claim 7, characterized in that the sensor is associated with the fixed bearing race of the bearing.

9. Steering system for automobile, characterized in that it includes a device according claim 2, the encoder is solidly in rotation with a steering wheel of a vehicle and the sensor, so as to measure the absolute angular position measurement of the steering wheel.

10. System according to claim 9, characterized in that the revolution or sector discrimination means includes a means for analyzing the differential speed of vehicle wheels.

11. System according to claim 9, characterized in that the means for discrimination of the revolution or sector includes an accelerometer or a gyroscope.

* * * * *